April 27, 1926.  
G. W. ROWDEN  
OVEN RACK SHIFTER  
Filed April 28, 1925    2 Sheets-Sheet 1
1,582,543
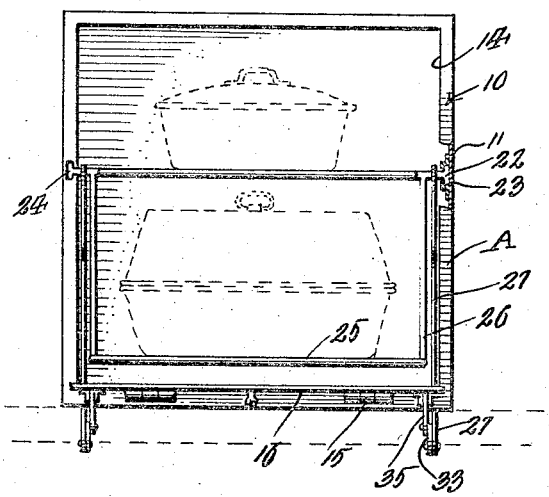
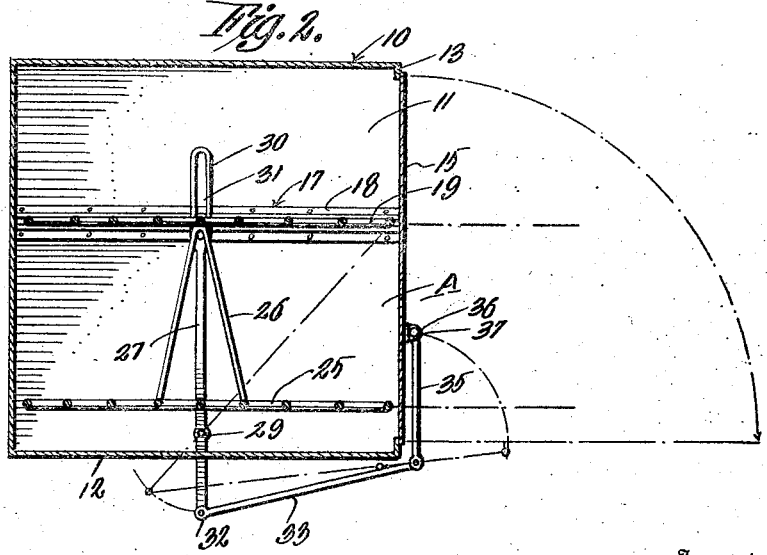
WITNESSES
Inventor  
GEORGE W. ROWDEN  
By  
Attorney April 27, 1926.
G. W. ROWDEN
1,582,543
OVEN RACK SHIFTER
Filed April 28, 1925        2 Sheets-Sheet 2
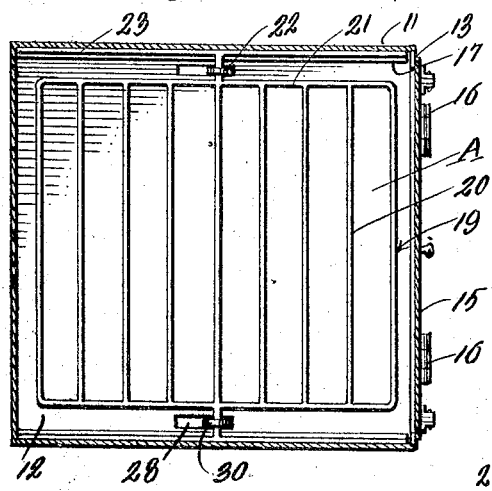
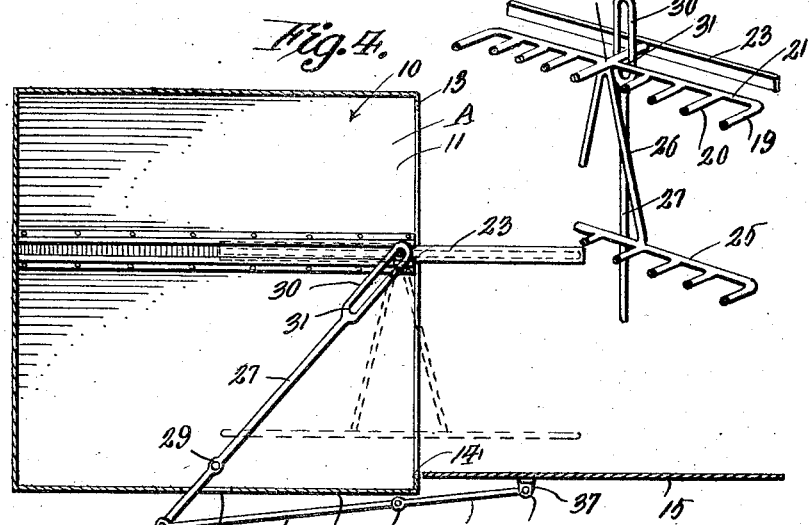
WITNESSES
Inventor
GEORGE W. ROWDEN
By
Attorney Patented Apr. 27, 1926.

1,582,543

UNITED STATES PATENT OFFICE.

GEORGE W. ROWDEN, OF ELLENWOOD, GEORGIA.

OVEN-RACK SHIFTER.

Application filed April 28, 1925. Serial No. 26,496.

*To all whom it may concern:*

Be it known that I, GEORGE W. ROWDEN, a citizen of the United States, residing at Ellenwood, in the county of Clayton and State of Georgia, have invented certain new and useful Improvements in Oven-Rack Shifters, of which the following is a specification.

This invention appertains to cooking stoves and more particularly to the oven thereof.

The primary object of the present invention is to provide a novel oven for cooking stoves embodying novel means for facilitating the placing and the removing of the food to be cooked into and out of the oven.

Another object of the invention is to provide an oven embodying sliding racks for supporting the food to be cooked and novel means for sliding the racks into and out of the oven during the manipulation of the oven door.

A further object of the invention is the provision of an oven embodying an upper sliding rack and a depending rack connected therewith, and novel means operatively connecting the upper sliding rack with the oven door for permitting the sliding of both the racks into and out of the oven during the opening and closing of the door.

A still further object of the invention is to provide a novel oven of the above character, which will be durable and efficient in use, one that will be simple and easy to manufacture, and which can be placed upon the market at a small cost.

With these and other objects in view, the invention consists in the novel construction, arrangement and formation of parts, as will be hereinafter more specifically described, claimed, and illustrated in the accompanying drawings, in which drawings:

Figure 1 is a front elevation of the improved oven, showing the door in its open position, Figure 2 is a longitudinal section through the same showing the door in its closed position, Figure 3 is a horizontal section through the oven showing the oven door in its closed position, Figure 4 is a longitudinal section through the oven showing the door in open position and the food rack slid outward of the oven, and Figure 5 is a detail fragmentary perspective view illustrating the arrangement and formation of the food racks.

Referring to the drawings in detail, wherein similar reference characters designate corresponding parts throughout the several views, the letter A generally indicates the improved oven, which in this instance is shown of the removable type generally employed in oil cook stoves, but it is to be understood that the principles of my invention can be incorporated with ovens of the stationary type.

The improved oven A embodies a body 10, which can be constructed in the usual or any preferred manner and the same embodies the conventional side walls 11, the bottom wall 12, and the front wall 13, which is provided with the enlarged opening 14 for permitting the placing of the food stuff to be cooked in the oven. A door 15 is provided for normally closing the opening 14 and is connected by means of hinges 16 with the front wall 13 adjacent to the lower edge thereof.

In accordance with this invention, the side walls 11 of the oven are provided with guide tracks 17 at a point intermediate their ends. The tracks 17 can be formed in any desired manner, and as shown are constructed from strips 18 riveted or otherwise secured to the said oven side wall. The guides 17 are arranged in the same horizontal plane and are adapted to support the upper oven rack 19 which can also be formed in any desired way. As shown the rack 19 is constructed from cross rods 20 and connecting side rods 21. The side rods 21 at their transverse center carry outwardly extending arms 22 which are rigidly connected to slide plates 23 disposed within the guide tracks 17. The front wall 13 of the oven is provided with key hole slots 24 which are in direct alinement with the guides in order to permit the food racks 19 to be slid out of the oven. A second rack 25 is arranged within the oven in spaced relation to the upper rack 19 and this rack 25 can be constructed in substantially the same manner as the upper rack 19. The sides of the rack 25 have rigidly connected thereto brackets 26 which are connected to the arms 22 of the upper rack. By this construction, the racks can be moved in unison.

As stated, the prime object of the invention is to permit the sliding of the racks during the opening and close of the oven door 15, to facilitate the placing and removing of the food stuff on and from the racks and in order to accomplish this object I provide shifting levers 27 which are arranged on opposite sides of the oven. The lower terminals of these levers 27 extend through suitable slots 28 formed in the bottom wall 12 and these levers are rockably mounted adjacent to their lower ends and directly above the lower walls 12 upon suitable pins 29 carried by the side walls of the oven. The upper terminals of the shifting levers 27 are provided with heads 30 having elongated slots 31 formed therein which receive the arms 22 formed on the upper racks 19. The lower terminals of the levers 27 have pivotally connected thereto as at 32, links 33 which extend forwardly toward the front of the oven. The forward terminals of these links have pivotally connected thereto as at 34 links 35, which are in turn pivotally connected as at 36 to the ears 37 carried by or formed on the oven door 15. The links 33 and 35 are in the nature of toggle levers and when the oven door is opened, that the levers 27 will be shifted causing the outward movement of the upper rack 19 and the lower rack 25. It is obvious that the food stuff can be readily placed upon the rack. Upon closing movement of the door the levers 27 will be again rocked causing the inward movement of the rack or trays.

From the foregoing description, it can be seen that I have provided novel means for automatically operating the rack of an oven by the opening and closing movement of the oven door.

Changes in details may be made without departing from the spirit or scope of this invention, but:

What I claim as new is:

1. In an oven, the combination, an oven body including side walls, guide tracks carried by the side walls, and a pivoted oven door, an upper rack, an outwardly extending arm carried by the sides of the rack, slide plates rigidly connected with the arm and slidably mounted within the tracks, a lower rack, means rigidly connecting the lower rack with the upper rack, shifting levers rockably mounted at a point intermediate their ends to the side walls of the oven, heads formed on the upper terminals of the levers provided with elongated slots for receiving the arms, links disposed on each side of the oven having their outer terminals connected respectively to the lower ends of the levers and to the oven door, and means pivotally connecting the meeting terminals of the links together.

2. In an oven, the combination, an oven body including side walls, and a pivoted oven door, a rack slidably carried by the side walls, shifting levers rockably mounted at a point intermediate their ends to the side walls of the oven, heads formed on the upper terminals of the lever slidably and pivotally connected to the opposite sides of the rack, links disposed on each side of the oven having their outer terminals connected respectively to the lower ends of the levers and to the oven door, and means pivotally connecting the terminals of the links together.

In testimony whereof I affix my signature.

GEORGE W. ROWDEN.